US011709917B2

(12) United States Patent
Ting (10) Patent No.: US 11,709,917 B2
(45) Date of Patent: Jul. 25, 2023

(54) POINT-SET KERNEL CLUSTERING (71) Applicant: NANJING UNIVERSITY, Nanjing (CN)

(72) Inventor: Kai Ming Ting, Nanjing (CN)

(73) Assignee: NANJING UNIVERSITY, Nanjing (CN)

(*) Notice: Subject to any disclaimer, the term of this patent is extended or adjusted under 35 U.S.C. 154(b) by 206 days.

(21) Appl. No.: 17/246,646

(22) Filed: May 2, 2021

(65) Prior Publication Data

US 2021/0350172 A1 Nov. 11, 2021

Related U.S. Application Data

(60) Provisional application No. 63/020,248, filed on May 5, 2020.

(51) Int. Cl.
*G06F 18/23* (2023.01)
*G06F 18/2321* (2023.01)
(Continued)

(52) U.S. Cl.
CPC .......... *G06F 18/23* (2023.01); *G06F 18/2321* (2023.01); *G06F 18/2431* (2023.01);
(Continued)

(58) Field of Classification Search
None
See application file for complete search history.

(56) References Cited

U.S. PATENT DOCUMENTS

2016/0267359 A1\* 9/2016 Gan ............ G06F 18/211
2019/0147220 A1\* 5/2019 McCormac ........ G06V 20/647
382/103
(Continued)

FOREIGN PATENT DOCUMENTS

CN 107368807 A \* 11/2017 ......... G06K 9/00718
CN 110378995 A \* 10/2019 ............ G06V 20/41

OTHER PUBLICATIONS

Bi-Cun Xu, Kai Ming Ting, and Zhi-Hua Zhou. 2019. Isolation Set-Kernel and Its Application to Multi-Instance Learning. Proc of the 25th ACM SIGKDD Inter. Conf. on Knowledge Discovery & Data Mining (Jul. 2019) NY, USA, 941-949 (Year: 2019).\*
Kai Ming Ting, Yue Zhu, and Zhi-Hua Zhou. 2018. Isolation Kernel and Its Effect on SVM. In Proceedings of the 24th ACM SIGKDD International Conference on Knowledge Discovery & Data Mining (Jul. 2018). Association for Computing Machinery, NY, USA, 2329-2337 (Year: 2018).\*
Zhang D, Han J, Cheng G, Yang MH. Weakly supervised object localization and detection: A survey. IEEE transactions on pattern analysis and machine intelligence. Apr. 20, 2021;44(9):5866-85. (Year: 2021).\*

(Continued)

*Primary Examiner* — Emily C Terrell
*Assistant Examiner* — Nathan J Bloom
(74) *Attorney, Agent, or Firm* — Shen Huang (57) ABSTRACT

A computer-implemented clustering method is disclosed for image segmentation, social network analysis, computational biology, market research, search engine and other applications. At the heart of the method is a point-set kernel that measures the similarity between a data point and a set of data points. The method has a procedure that employs the point-set kernel to expand from a seed point to a cluster; and finally identifies all clusters in the given dataset. Applying the method for image segmentation, it identifies several segments in the image, where points in each segment have high similarity: but points in one segment have low similarity with respect to other segments. The method is both effective and efficient that enables it to deal with large scale datasets. In contrast, existing clustering methods are either efficient or effective; and even efficient ones have difficulty dealing with large scale datasets without massive parallelization.

15 Claims, 7 Drawing Sheets

(51) Int. Cl.
  *G06F 18/2431* (2023.01)
  *G06V 10/77* (2022.01)
  *G06V 10/762* (2022.01)
  *G06V 10/46* (2022.01)

(52) U.S. Cl.
  CPC ............ *G06V 10/46* (2022.01); *G06V 10/762* (2022.01); *G06V 10/77* (2022.01); *G06F 2218/08* (2023.01); *G06F 2218/12* (2023.01)

(56) References Cited

U.S. PATENT DOCUMENTS

2021/0104331 A1\* 4/2021 Mysore .................. G16H 70/40
2021/0350147 A1\* 11/2021 Yuan .................. G01C 21/3837

OTHER PUBLICATIONS

Piernik, M., Morzy, T. A study on using data clustering for feature extraction to improve the quality of classification. Knowl Inf Syst 63, 1771-1805 (May 2021). https://doi.org/10.1007/s10115-021-01572-6 (Year: 2021).\*
Inventor, Dr. Kai Ming Ting's thesis.

\* cited by examiner (a) Isolation Kernel  (b) Gaussian Kernel

(a) Density distribution using KDE    (b) $\hat{K}$ distribution

(a) Largest 13 clusters  (b) Noise

FIG. 9

(a) Scaleup test  (b) Total runtimes of kernel k-means

FIG. 10

(a) Aggregation  (b) S3  (c) Spiral

POINT-SET KERNEL CLUSTERING

CROSS-REFERENCE TO RELATED APPLICATIONS

This application claims the benefit of U.S. Provisional Application No. 63/020,248, filed on May 5, 2020, the contents of which are incorporated herein by reference.

BACKGROUND

This invention relates to combinations of segmentations, and particularly to a computer-implemented clustering method for data mining in image segmentation, social network analysis, computational biology, market research, search engine and other applications.

The explosive growth of data generated nowadays has presented an urgent need to improve the efficiency of data mining. Data mining is defined as a process used to extract usable data from a larger set of any raw data. Among major data mining tasks, clustering is a technique to discover groupings in a given dataset.

A clustering algorithm groups data points into clusters based on the notion of similarity between data points. Example existing algorithms are K-means clustering, Density-Based Spatial Clustering of Applications with Noise (DBSCAN) and hierarchical clustering. The state-of-art algorithms are density-peak clustering (DP) and scalable kernel k-means. However, these clustering algorithms hardly achieve both high-quality clustering outcomes and runtime efficiency. For instance, DP is strong in clustering outcomes, but it is also one of the most computationally expensive algorithms due to the use of a similarity between two data points: it needs large memory space and its runtime is proportional to the square of data size ($n^2$); while scalable kernel k-means is efficient yet not effective due to the use of kernel which has intractable dimensionality and is data independent.

The present description discloses the first kernel-based clustering which has runtime proportional to data size and yields clustering outcomes that are superior to those of existing clustering algorithms.

SUMMARY

This summary is not an extensive overview of the disclosure and it does not exhaustively identify key/critical elements of the invention or delineate the scope of the invention. Its sole purpose is to present the rationale behind the disclosure herein in a simplified form as a prelude to the more detailed description that is presented later.

A computer implemented method of image segmentation is comprised of: receiving one image; and Application data descriptor step: converting the image into a dataset of some descriptors e.g., CIELAB, to form a dataset E; and Conversion using Isolation Kernel step: converting each point in dataset E, using a feature map of Isolation Kernel, to a point in a dataset D; and Seed finding step: using a point-set kernel to find the most similar point wrt (with respect to) D and then use it as an initial seed for cluster G; and Cluster growing step: growing the cluster G at a set rate (Q) incrementally using the point-set kernel by recruiting most similar points from D wrt G; and the cluster stops growing when all points excluding G in D have similarities wrt D less than or equal to $\tau$, where $\tau$ is a user-defined similarity threshold; and growing the next cluster using the remaining points in dataset D excluding G by restarting from the Seed finding step, until D is empty or no point can be found which has similarity more than $\tau$.

The most similar point as the initial seed for cluster G in the dataset D is defined based on a point-set kernel $\hat{K}$ as $\text{argmax}_{x \in D} \hat{K}(x, D)$. In the cluster growing step, the most similar point to grow a cluster G is obtained from $\text{argmax}_{x \in D} \hat{K}(x, G)$, where D excludes all points already in G.

CIELAB is a color space based on human perception. Instead of using Red, Green, and Blue as the "axes", CIELAB uses Lightness (Black/White), "a" (Green/Red), and "b" (Blue/Yellow). CIELAB color space provides a perceptually uniform color space. In this color space, the distance between two points approximates how different the colors are in luminance, chroma, and hue.

Further, the point-set kernel clustering method can be applied to cluster a set of images, and in social network analysis, computational biology, market research, search engine and other applications by replacing the one image with a dataset in each of these applications.

When the clustering method is applied to cluster a set of images into several subsets of images, the given dataset is a set of images. In each of the above applications (social network analysis, computational biology, market research, search engine etc), psKC can be applied to either segmenting one data object into multiple segments, or clustering a set of data objects into several subsets of data objects, as exemplified when the data objects are images. The choice depends on the desired outcome and the problem formulation. For example, when the clustering method is applied in social network analysis, one can either segment one social network data object into multiple segments, or cluster a set of social network data objects into subsets of social network data objects.

Further, wherein a data descriptor for each application shall be used to describe the original dataset, consisting of either one data object or a set of data objects, into a set of points in vector representation.

Further, wherein using the feature map of Isolation Kernel converting each point of dataset E to a point in dataset D is comprised of: using a random sample of $\psi$ points from dataset E to produce a Voronoi diagram, where each Voronoi cell isolates one point from the rest of the points in the sample. A total of t Voronoi diagrams are produced from dataset E and each point x in dataset E is converted using the t Voronoi diagrams to produce a feature vector $\Phi(x)$ of $t\psi$ binary attributes in dataset D: $x \to \Phi(x)$.

Further, wherein using the point-set kernel to find the most similar point wrt D is comprised of producing kernel mean map $\hat{\Phi}(G)$ from a set of points G via averaging, and measuring similarity between point x and set G using the point-set kernel, $$\hat{K}(x, G) = \langle \Phi(x), \hat{\Phi}(G) \rangle$$

and $$\hat{\Phi}(G) = \frac{1}{|G|} \sum_{y \in G} \Phi(y)$$

where $\hat{\Phi}$ is a kernel mean map of $\hat{K}$; and $\Phi$ is the feature map of Isolation Kernel k; and $\langle a, b \rangle$ denotes a dot product between two vectors a and b.

As the point-set kernel is constructed from a dataset D, the point-set kernel equations can be more precisely expressed as:

$$\hat{K}(x, G \mid D) = \langle \Phi(x \mid D), \hat{\Phi}(G \mid D) \rangle$$

and $$\hat{\Phi}(G \mid D) = \frac{1}{|G|} \sum_{y \in G} \Phi(y \mid D)$$

where $G \subseteq D$, and $\Phi$ is the feature map of Isolation Kernel which is constructed from D.

Further, wherein a post-processing can be applied to all clusters produced by point-set kernel clustering to ensure that the following objective is achieved:

$$\operatorname{argmax}_{G^1, \ldots, G^k} \sum_{j=1}^{k} \sum_{x \in G^j} \langle \Phi(x), \hat{\Phi}(G^j) \rangle,$$

where a dataset D having k clusters, $G^j$, j=1, ..., k, the post-processing re-examines all points which have the lowest similarity regarding cluster $G^j$ if they could be reassigned to other cluster to maximize the total similarity.

Further, wherein the similarity threshold $\tau < 1$ and growth rate $\varrho \in (0,1)$.

Software stored on a non-transitory machine-readable medium is comprised of instructions for enabling a data processing system to:
a) receive one image; and
b) convert the image into a dataset of some descriptors e.g., CIELAB, to form a dataset E; and
c) convert each point in dataset E, using a feature map of Isolation Kernel, to a point in a dataset D; and
d) use a point-set kernel to find the most similar point wrt D and then use it as an initial seed for cluster G; and
e) grow cluster G at a set rate ($\varrho$) incrementally using the point-set kernel by recruiting most similar points from dataset D wrt G; and the cluster stops growing when all points excluding G in dataset D have similarities wrt D less than or equal to $\tau$, where $\tau$ is a similarity threshold; and
f) grow the next cluster using the remaining points in dataset D excluding G by restarting from step d, until D is empty or no point can be found which has similarity more than $\tau$.

The kernel-based clustering which is based on a point-set kernel, i.e., point-set kernel clustering (psKC), is described. In an embodiment, it characterizes every cluster of arbitrary shape, varied density and size in a dataset, from a seed; and runs orders of magnitude faster than existing state-of-the-art clustering algorithms which have quadratic time cost.

Figure 5:
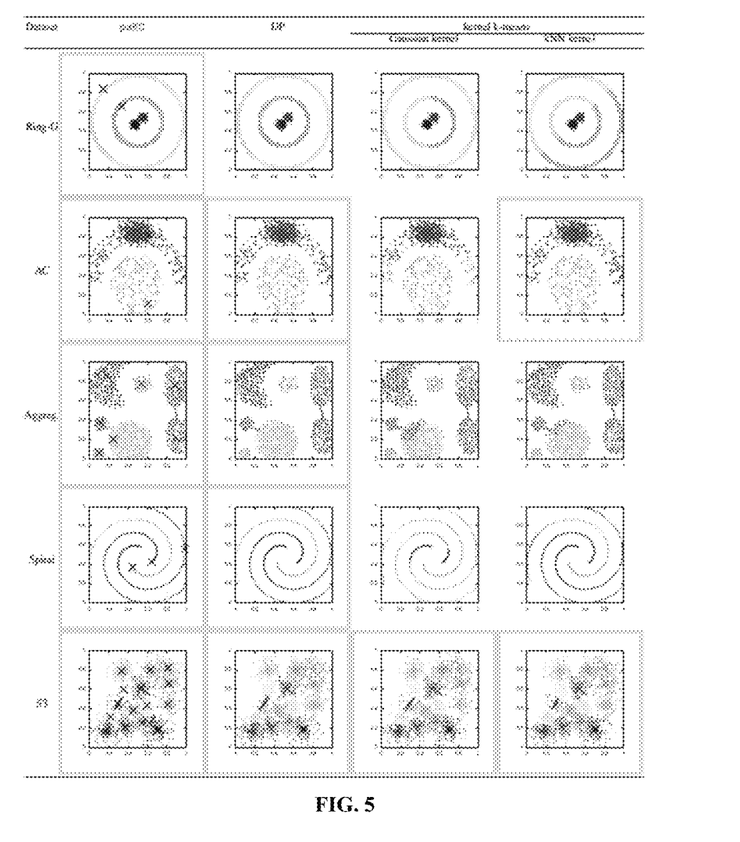
FIG. 5 compares the clustering outcomes of four clustering algorithms on five benchmark datasets.

Comparatively, density-peak clustering DP did well in five benchmark datasets shown in FIG. 5, but it did poorly on the Ring-G dataset; and kernel k-means did poorly on at least three out of the five datasets, i.e., Ring-G, Aggregation and Spiral. In an embodiment, psKC yielded clustering results close to human perception on a low-resolution image. As for other clustering algorithms, only scalable kernel k-means could complete the low-resolution image in reasonable time and it produced more clusters than anticipated by human perception. On a high-resolution image of more than 1 million pixels, psKC completed the clustering process in about an hour. In contrast, scalable kernel k-means could not complete the task in more than four days on the same machine, and DP was unable to load the dataset on a machine with 256 GB of main memory because of high memory requirement.

In an embodiment, the computed ratio of psKC in a scaleup test using the MNIST8M dataset, which has a total 8.1 million data points with 784 dimensions, was linear to the data size. The algorithmic advantage of psKC, together with the use of the point-set kernel, allows it to run on a standard machine of single-CPU (for clustering) and GPU (for feature mapping in pre-processing). This enables the clustering to be run on a commonly available machine (with both GPU and CPU) to deal with large scale datasets. In a nutshell, it is the only clustering algorithm that can process millions of data points on a commonly used machine.

BRIEF DESCRIPTION OF THE DRAWINGS

The present description will be better understood from the following detailed description and the accompanying drawings. The details of the present invention, both as to its structure and operation, can best be understood by referring to the accompanying drawings, in which like reference numbers and designations refer to like elements.

DETAILED DESCRIPTION OF EMBODIMENTS

The point-set kernel relies on how similar a data point x, represented as a vector, is to a set of data points G, a point-set kernel is represented as:

$$\hat{K}(x, G) = \langle \hat{\Phi}(x), \hat{\Phi}(G) \rangle$$

and $$\hat{\Phi}(G) = \frac{1}{|G|} \sum_{y \in G} \Phi(y)$$

where $\hat{\Phi}$ is a kernel mean map of $\hat{K}$ and $\Phi$ is the feature map of a point-to-point kernel and $\langle a, b \rangle$ denotes a dot product between two vectors a and b.

Computing time: the summation in $\hat{\Phi}(G)$ needs to be done once only as a pre-processing. Then computing $\hat{K}(x,G)$ based on the dot product, takes a fixed amount of time only, independent of n (the data size of G). Therefore, to compute the similarity of x with respect to G for all points x in G, i.e., $\hat{K}(x,G) \forall x \in G$, has a computational cost which is proportional to n only.

Note that kernel mean embedding is an approach to convert a point-to-point kernel into a distribution kernel which measures the similarity between two distributions. The point-set kernel can be viewed as a special case of kernel mean embedding. Kernel mean embedding uses the same kernel mean map as used here.

The use of the feature map is necessary to achieve the stated efficiency. The alternative, which employs the point-to-point kernel/distance directly in the computation, will have a computational cost that is proportional to $n^2$—the root cause of high computational cost in existing density-based algorithms. The point-set kernel formulation assumes that the point-to-point kernel has a finite-dimensional feature map. Commonly used point-to-point kernels (such as Gaussian and Laplacian kernels) have two key limitations: they have a feature map of intractable dimensionality; and their similarity is independent of a given dataset. The first limitation prevents these kernels to be used in the formulation directly.

Figure 1:
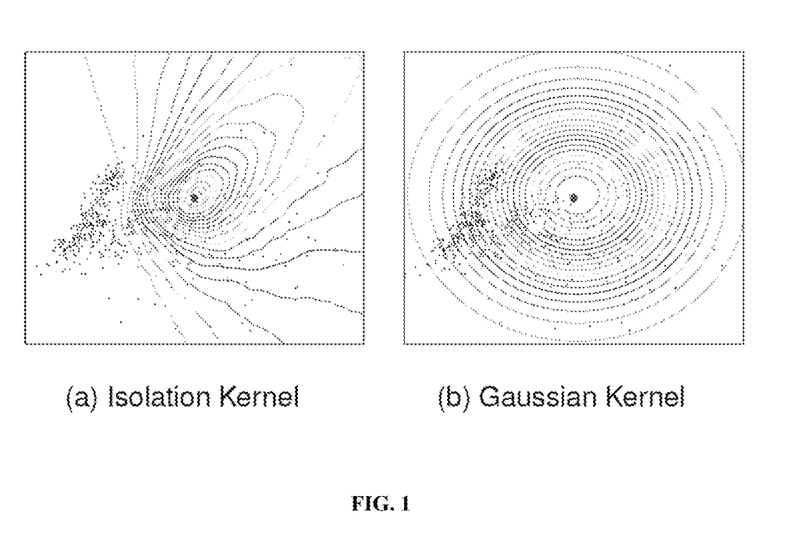
FIG. 1 shows contour plots of Isolation Kernel and Gaussian Kernel on a real-world dataset.

Therefore, a recently introduced point-to-point kernel, which has an exact finite dimensional feature map called Isolation Kernel, is used in $\hat{K}$. Isolation Kernel is a data dependent kernel that is derived directly from data. Isolation Kernel is employed here because it is data dependent, which is essential to a good clustering outcome. Employing a Gaussian Kernel, which is data independent, psKC will perform poorly on datasets with clusters of non-globular shape, different data sizes and/or densities. This is because its similarity measurement is independent of data distribution. As shown in FIG. 1a, each contour line of Isolation Kernel, which denotes the same similarity to the center (red point), is elongated along the sparse region and compressed along the dense region. In contrast, Gaussian kernel (or any data independent kernel) has the same symmetrical contour lines around the center point, independent of data distribution (shown in FIG. 1b).

Isolation Kernel has two characteristics, which are antitheses to the two limitations of data independent kernels mentioned above. The first is that it has a finite-dimensional feature map, which enables Isolation Kernel to be used directly in the point-set kernel as the exact finite dimensional feature map is crucial in achieving runtime proportional to data size. The second refers to its similarity adapts to local density of the data distribution of a given dataset, which means that two points in a sparse region are more similar than two points of equal inter-point distance in a dense region. This characteristic is crucial for the clustering algorithm to obtain good clustering outcomes.

As the point-set kernel is constructed from a dataset D, the point-set kernel equations can be more precisely expressed as:

$$\hat{K}(x, G \mid D) = \langle \Phi(x \mid D), \hat{\Phi}(G \mid D) \rangle$$

and $$\hat{\Phi}(G \mid D) = \frac{1}{|G|} \sum_{y \in G} \Phi(y \mid D)$$

where $G \subseteq D$, and $\Phi$ is the feature map of Isolation Kernel which is constructed from D. Note that Isolation Kernel has no closed form expression.

The point-set kernel can be used to describe a cluster in terms of similarity distribution, independent of the clustering process. Given a dataset D having k clusters $G^j$, j = 1, ..., k. The clusters could be the ground truth, or the clustering outcome of an algorithm. The $\hat{K}$ similarity distribution of all clusters $G^j$ in D is defined as:

$$\forall x \in D, \max_j \hat{K}(x, G^j)$$

The properties of the point-set kernel for points outside the cluster are described as follows. Given a dataset D and a cluster $G \subset D$. Let x, x' $\in$ D\G; the distance between x and a set G be $$l(x, G) = \min_{z \in G} \|x - z\|;$$

and $\rho(x)$ denotes the density of x. Properties of the point-set kernel derived from D include: (a) Fall-off-the-cliff property: $\hat{K}(x,G)$ decreases sharply as $l(x,G)$ increases; (b) Data dependent property:

$$\frac{d\hat{K}(x, G)}{dx} > \frac{d\hat{K}(x', G)}{dx'},$$

if $l(x,G)=l(x',G)$ and $\rho(\mathrm{argmin}_{z \in G}\|x-z\|) > \rho(\mathrm{argmin}_{z \in G}\|x'-z\|)$. In other words, the rate of falling-off at x is data dependent, i.e., it is proportional to the density at the point G closest to x, i.e., $\mathrm{argmin}_{z \in G}\|x-z\|$ and inversely proportional to $l(x,G)$.

These properties enable each cluster to be expanded radially in all directions from a seed in multiple iterations, where each iteration recruits a subset of new members in the immediate neighborhood of the expanding cluster and arbitrary-shaped clusters of different densities and sizes to be discovered through growing a cluster.

Figure 2:
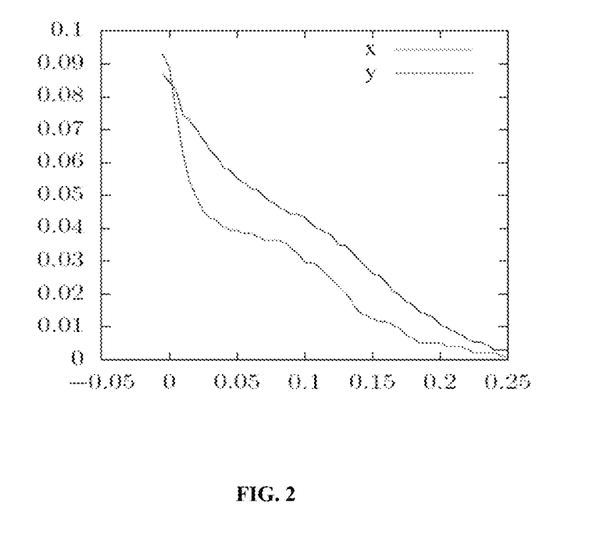
FIG. 2 is a diagram demonstrating the fall-off-the-cliff property of $\hat{K}$.
Figure 3:
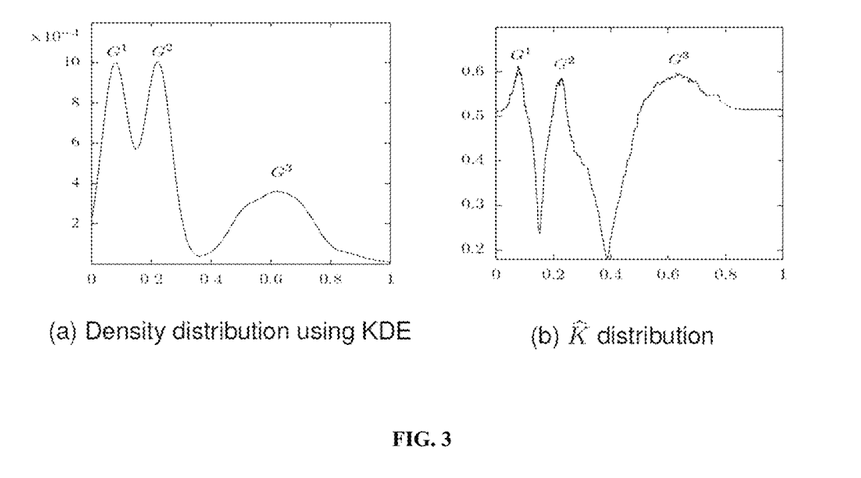
FIG. 3 is a diagram comparing density distribution and $\hat{K}$ similarity distribution on a one-dimensional dataset having two dense clusters and one sparse cluster.

FIG. 2 shows that the rate of falling-off is higher with respect to the dense cluster than that with respect to the sparse cluster, where x is close to the dense cluster $G^2$ and y is close to the sparse cluster $G^3$. FIG. 3 shows the clustering outcome of psKC with $\hat{K}$ distribution, where the y-axis is similarity and the x-axis are the positions of the one-dimensional dataset, in comparison to that of the density distribution as estimated by a kernel density estimator using Gaussian kernel. Notice that the 'valley' between the two dense clusters is significantly sharper than that between the sparse cluster and the dense cluster. This is a direct result of the two properties mentioned above.

The clustering, called point-set kernel clustering or psKC, employs the point-set kernel $\hat{K}$ to characterize clusters. It identifies all members of each cluster by first locating the seed in the dataset. Then, it expands its members in the cluster's local neighborhood which grows at a set rate ($\varrho$) incrementally; and it stops growing when all unassigned points having similarity with respect to the cluster fall below a threshold ($\tau$). The process repeats for the next cluster using the remaining points in dataset D, yet to be assigned to any clusters found so far, until D is empty or no point can be found which has similarity more than $\tau$. All remaining points after the entire clustering process are noise as they are less than the set threshold for each of the clusters discovered. The psKC procedure is shown in Algorithm 1.

| | Algorithm 1: point-set Kernel Clustering psKC |
|---|---|
| | Input : D - given dataset, $\tau$ - similarity threshold, $\varrho$ - growth rate |
| | Output: $G^j$, j = 1, . . . , k - k clusters. N - noise set |
| 1 | k = 0; |
| 2 | while $\|D\|$ > 1 do |
| 3 |     $x_p$ = argmax$_{x \in D}$ $\hat{K}$ (x, D): |
| 4 |     $x_q$ = argmax$_{x \in D \setminus \{x_p\}}$ $\hat{K}$ (x, {$x_p$}); |
| 5 |     $\gamma$ = (1 – $\varrho$) × $\hat{K}$ ($x_q$, {$x_p$}); |
| 6 |     if $\gamma \leq \tau$ then |
| 7 |        Terminate while-do loop; |
| 8 |     end |
| 9 |     k++: |
| 10 |     $G_0^k$ = {$x_p$, $x_q$}; |
| 11 |     for (i = 1; $\gamma > \tau$; i++) do |
| 12 |        $G_i^k$ = {x ∈ D | $\hat{K}$ (x, $G_{i-1}^k$) > $\gamma$}; |
| 13 |        $\gamma$ = (1 – $\varrho$)$\gamma$; |
| 14 |     end |
| 15 |     $G^k$ = $G_{i-1}^k$; |
| 16 |     D = D \ $G^k$: |
| 17 | end |
| 18 | N = D; |
| 19 | return $G^j$, j = 1, . . . , k: N: |

The cluster, grown from a seed, according to psKC can be formally defined as follows: A $\widehat{K_\varrho^\tau}$-expanded cluster grows from a seed $x_p$ selected from D, using $\hat{K}(\cdot,\cdot)$ with similarity threshold $\tau<1$ and growth rate $\varrho \in (0,1)$, is defined recursively as:

$$G_i = \{x \in D | \hat{K}(x, G_{i-1}) > \gamma_i > \tau\}$$

where $x_q$=argmax$_{x \in D\setminus\{x_p\}}\hat{K}(x,\{x_p\})$; $G_0=\{x_p, x_q\}; \gamma_i = (1-\varrho)\gamma_{i-1}\}$; and $\gamma_0=(1-\varrho)\hat{K}(x_q,\{x_p\})$.

Let $G^j$ be $\widehat{K_\varrho^\tau}$-expanded cluster j from dataset D. The number of $\widehat{K_\varrho^\tau}$-expanded clusters in dataset D is discovered automatically by repeating the above cluster growing process on $G^k$ from D\{$G^j$, j=1, . . . , k–1}. After discovering all $\widehat{K_\varrho^\tau}$-expanded clusters $G^j$ in D, noise is defined as $$N=\{x \in D | \forall j \hat{K}(x,G^j) \leq \tau\}.$$

A post-processing can be applied to all clusters produced by psKC to ensure that the following objective is achieved:

$$\text{argmax}_{G^1,\ldots,G^k} \sum_{j=1}^{k} \sum_{x \in G^j} \langle \Phi(x), \hat{\Phi}(G^j) \rangle.$$

This post-processing re-examines all points which have the lowest similarity regarding cluster $G^j$ if they could be reassigned to other cluster to maximize the total similarity. This re-examination begins with points in $G^j$, j=1, . . . , k in the order the clusters are produced.

Figure 4:
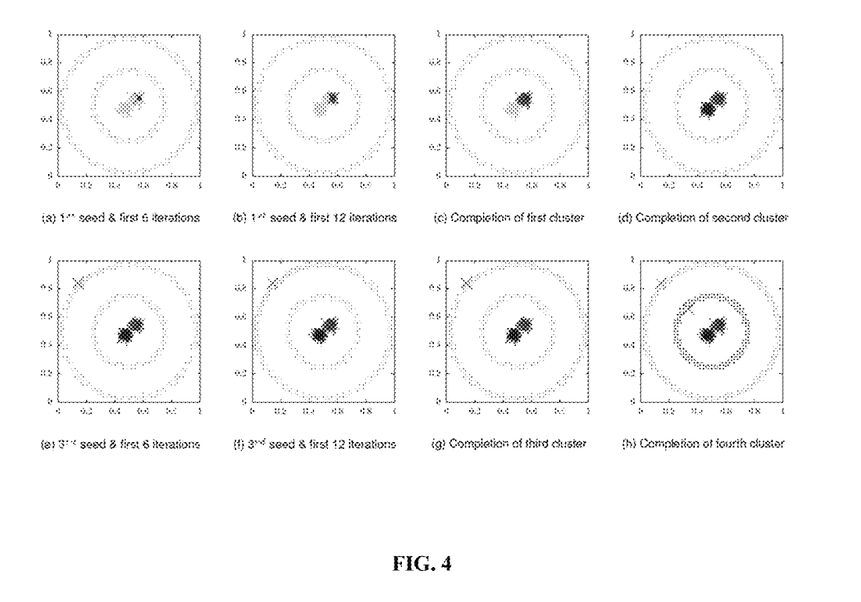
FIG. 4 shows the psKC clustering outcome on the Ring-G dataset.

FIG. 4 demonstrates the clustering process of psKC, based on a two-dimensional dataset which has data points distributed in two concentrically rings and two Gaussian clusters. Crosses indicate the seed points used by psKC. Gray points are data points in D which are yet to be clustered. The number of iterations refers to that in lines 11-14 in Algorithm 1. The number of iterations used to recruit all members of each cluster is as follows: 20, 19, 20 & 20. FIG. 4a shows the progression of identifying the first seed and growing the first cluster to include all members found in the first 6 iterations; followed by including all members found in the first 12 iterations in FIG. 4b; and all members in the first cluster are found in FIG. 4c—this is when $\hat{K}(x;G^1)<\tau$, for all x in D excluding $G^1$. The same process in identifying the third cluster, i.e., the outer ring, is shown in the first three subfigures in the second row of FIG. 4.

Figure 12:
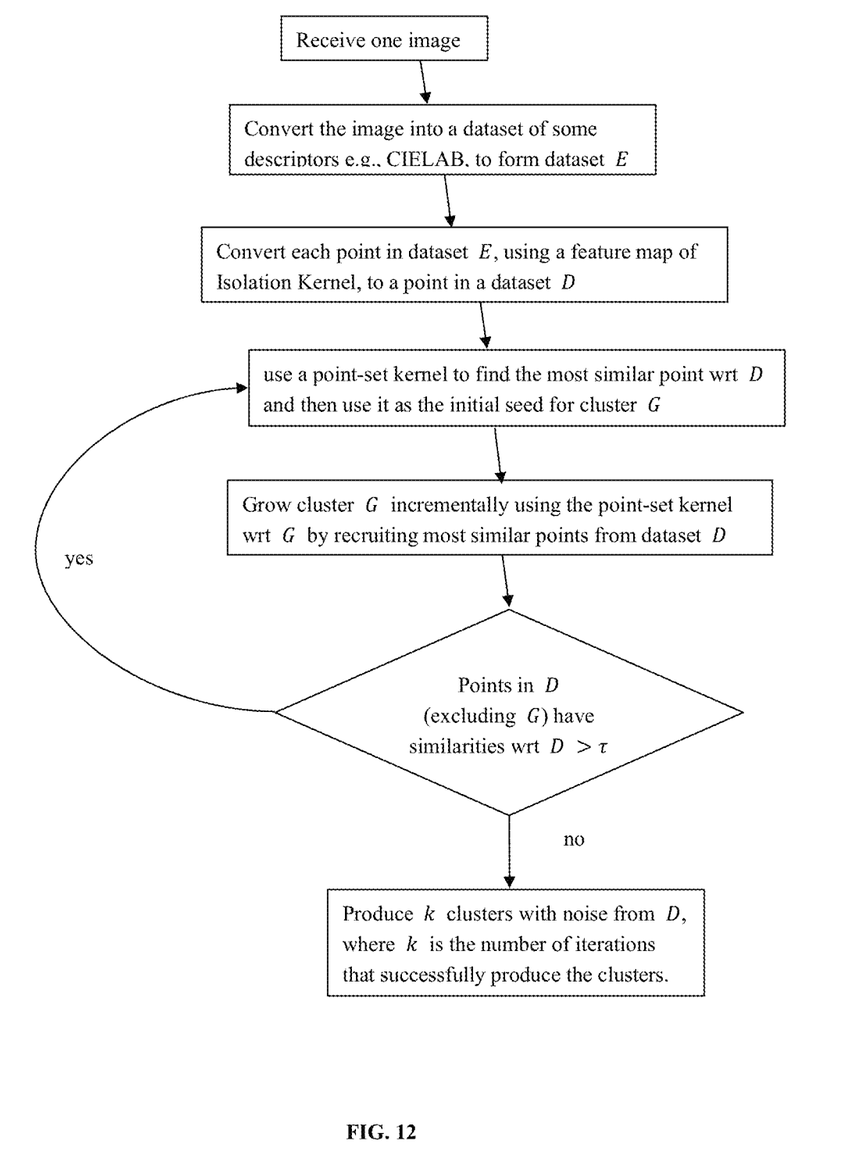
FIG. 12 shows the steps of the method of image segmentation based on psKC.

As shown in FIG. 12, the method of image segmentation based on psKC is comprised of steps as follows:

receiving one image; and

Application data descriptor step: converting the image into a dataset of some descriptors e.g., CIELAB, to form a dataset E; and Conversion using Isolation Kernel step: converting each point in dataset E, using a feature map of Isolation Kernel, to a point in a dataset D; and Seed finding step: using a point-set kernel to find the most similar point wrt D and then use it as an initial seed for cluster G; and Cluster growing step: growing the cluster G incrementally using the point-set kernel by recruiting most similar points from dataset D wrt G; the cluster stops growing when all points excluding G in D have similarities less than or equal to $\tau$, where $\tau$ is a similarity threshold; and growing the next cluster using the remaining points in dataset D excluding G by restarting from the Seed finding step, until the dataset D is empty or no point can be found which has similarity more than $\tau$.

Figure 13:
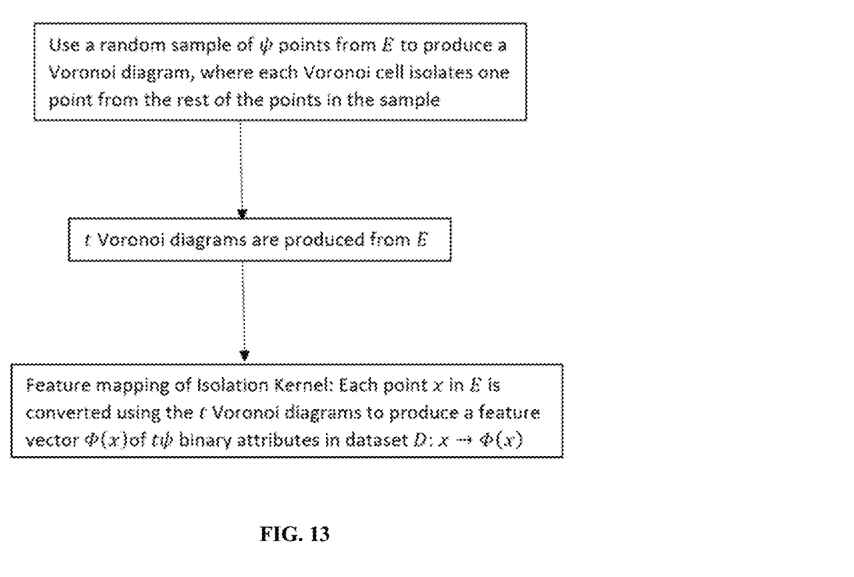
FIG. 13 shows the steps of using the feature map of Isolation Kernel converting points from dataset E to dataset D.

As shown in FIG. 13, using the feature map of Isolation Kernel converting points from dataset E to dataset D comprises: using a random sample of $\psi$ points from dataset E to produce a Voronoi diagram, where each Voronoi cell isolates one point from the rest of the points in the sample, t Voronoi diagrams are produced from dataset E and each point x in dataset E is converted using the t Voronoi diagrams to produce a feature vector $\Phi(x)$ of t$\psi$ binary attributes in dataset D: x→$\Phi(x)$.

Figure 14:
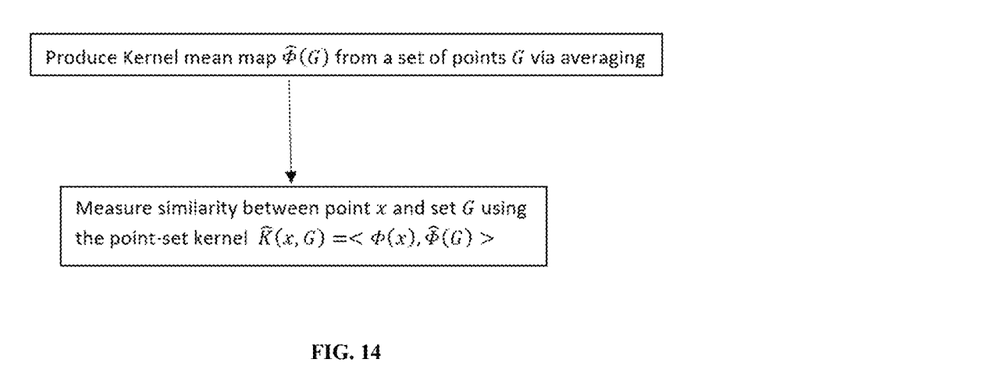
FIG. 14 shows the steps of using the point-set kernel to find points to grow cluster G (when the point-set kernel is used to find the seed, D instead of G is the benchmark in the similarity measurement).

As shown in FIG. 14, using the point-set kernel to find the seed and to grow cluster $G_i$ comprises: producing Kernel mean map $\hat{\Phi}(G)$ from a set of points G via averaging their feature mapped points $\Phi(x)$, and measuring similarity between point x and set G using the point-set kernel, $\hat{K}(x,G)=\langle\Phi(x), \hat{\Phi}(G)\rangle$.

The use of Isolation Kernel in the point-set kernel enables similarity between a point and a set to be computed efficiently, without the need to compute point-to-point similarity/distance—the root cause of high time complexity in existing algorithms. The finite dimensional feature map of Isolation Kernel and its use in the point-set kernel enable the algorithm to achieve its full potential: runtime proportional to data size (n)—a level unable to be achieved by existing effective clustering algorithms such as DP, and even less effective but efficient algorithms such as scalable kernel k-means. They have runtimes at least proportional to $n^2$. Time complexity of psKC is demonstrated in the following table given that the maximum number of iterations is fixed given the threshold $\tau$ and growth rate $\varrho$, independent of the data size. t and $\psi$ are parameters of Isolation Kernel.

TABLE 1

| 1 | Build Isolation Kernel (IK) | $O(t\psi)$ |
|---|---|---|
| 2 | Mapping D of n points using feature map of IK | $O(nt\psi)$ |
| 3 | Assume that it produces k clusters and each cluster of n/k points takes b iterations* | $O(bnt\psi)$ |
|   | Total time cost | $O(bnt\psi)$ |

In order to compare the clustering performance with existing clustering algorithms including DP, scalable kernel k-means which employs Gaussian kernel, and kernel k-means, which employs an adaptive kernel, five experiments were conducted: one for reporting clustering outcomes on artificial datasets, one for clustering outcome on one image (each having high or low resolution), one for clustering a set of images into subsets of images, one for the scaleup test and one for a stability analysis.

Parameter search ranges. Parameters are searched in each of the algorithms, i.e., DP, scalable kernel k-means, kernel k-means and psKC; and their best clustering outcomes are reported after the search. psKC is implemented in C++. Scalable kernel k-means is implemented in Scala as part of the Spark framework; DBSCAN is implemented in Java as part of the WEKA framework. and DP, $DP_{ik}$, k-means and kNN kernel are implemented in MATLAB.

The parameter search ranges used in the experiments on artificial datasets are:

(1) DP: $\in$ (the bandwidth used for density estimation) is in [0.001 m, 0.002 m, . . . , 0.4 m] where m is the maximum pairwise distance. The number of clusters is set to the true number of clusters.

(2) Kernel k-means: k in kNN kernel is in [0.01n, 0.02n, . . . , 0.99n]; and the number of dimensions used is 100. The number of clusters is set to the true number of clusters.

(3) Scalable kernel k-means: σ in [0.1, 0.25, 0.5, 1, . . . , 16, 24, 32]; k is set to the true number of clusters; s=100 (the target dimensions of the PCA step) and c=400 (sketch size for the Nyström dimensional output), except for data set less than 400 points then it is s=20 and c=200.

(4) psKC: $\psi$ in [2, 4, 6, 8, 16, 24, 32], t=100, $\tau$=0.1 and σ=0.1.

(5) $psKC_g$: $\gamma=2^i$ where i in [1, 2, 3, . . . , 16], $\tau$=0.1 and σ in [0.1, 0.01, 0.001, . . . , $1 \times 10^{-10}$].

(6) DBSCAN: $\in$ in [0.001 m, 0.002 m, . . . , 0.999 m] and MinPts in [2, 3, . . . , 30], where m is the maximum pairwise distance and MinPts is the density threshold.

(7) $DP_{ik}$: For DP, $\in$ is in [0.001 m, 0.002 m, . . . , 0.4 m] where m is the maximum pairwise distance. The number of clusters is set to the true number of clusters. For Isolation Kernel: $\psi$ in [2, 4, 6, 8, 16, 24, 32] and t=100.

(8) k-means: The number of clusters is set to the true number of clusters.

The experiments ran on a Linux CPU machine: AMD 16-core CPU with each core running at 2.0 GHz and 32 GB RAM. The feature space conversion was executed on a machine having GPU:2×GTX 1080 Ti with each card having 12 GB RAM. Both are commonly used machines.

Clustering outcomes on artificial datasets. In the first experiment, five commonly used benchmark datasets, namely Ring-G, AC, Aggregation, Spiral and S3 are used.

As shown in FIG. 5, it is notable that DP did well on four benchmark datasets, but it did poorly on the Ring-G dataset, i.e., DP successfully identified one ring cluster and one Gaussian cluster; but split the second Gaussian cluster into two parts, where one part is joined with the second ring cluster. This is because DP has a weakness in identifying the correct peaks when some clusters are uniformly distributed and have varied densities. In this case, three out of the four peaks are identified in the two Gaussian clusters before other points are assigned to one of the peaks to form clusters.

The two versions of kernel k-means are weaker algorithms than DP as they did poorly on at least three out of the five datasets, i.e., Ring-G, Aggregation and Spiral. This is because of the use of k-means which has fundamental weaknesses in detecting clusters that have non-globular shapes. The use of a kernel in both kernel k-means transfers these fundamental weaknesses from input space to feature space. The results show that there is no guarantee that they can detect clusters of non-globular shapes.

Point-set kernel clustering is the only algorithm that did well in all five datasets; and it is the only algorithm that successfully identified all four clusters in the Ring-G dataset. This is a direct result of the cluster identification procedure which employs the point-set kernel. Other algorithms failed to correctly identify the four clusters because their algorithmic design which must determine all density peaks/centers before individual points can be assigned to one of the peaks/centers.

Clustering outcomes on one image (each having high or low resolution). In the second experiment, three photographic images of resolutions from low to high: Forbidden City Gate (499×324 pixels), Vincent van Gogh's Starry night over the Rhone 2 (932×687 pixels) and Chinese Painting: Zhao Mengfu's Autumn Colors (2,005×500 pixels), are used to compare the clustering outcome. Color images are represented in the CIELAB color space. All clustering algorithms in the comparison are presented with a dataset with this CIELAB representation when an image is to be segmented.

Figure 6:
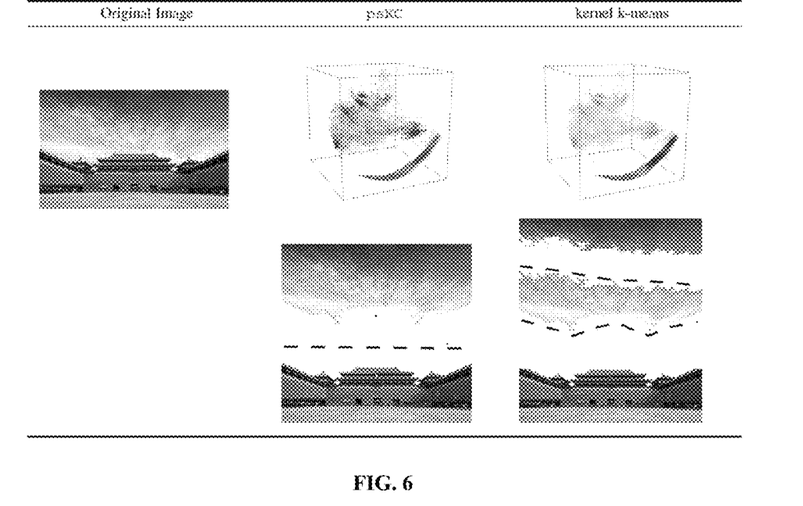
FIG. 6 shows the clustering outcomes of psKC and scalable kernel k-means on the 'Forbidden City Gate' image.

As shown in FIG. 6, out of the three contenders of psKC, only scalable kernel k-means could complete the low-resolution image in reasonable time. The example shows that kernel k-means produced more clusters than anticipated by human perception, i.e., kernel k-means produced three clusters, instead of two. This is because the data distribution, shown in the CIELAB space, has one elongated cluster. Kernel k-means is likely to split an elongated cluster into two or more clusters. It produced an even poorer clustering outcome if it is asked to produce two clusters on this dataset. In contrast, psKC could discover the two clusters, without splitting the sky into two. Note that the Forbidden City Gate image has a total of 161,676 pixels. DP could only process a lower resolution of this image of 60,000 pixels. Like kernel k-means, DP identified this elongated cluster to have two peaks instead of one, which is one weakness of the DP peaks identification procedure.

Figure 7:
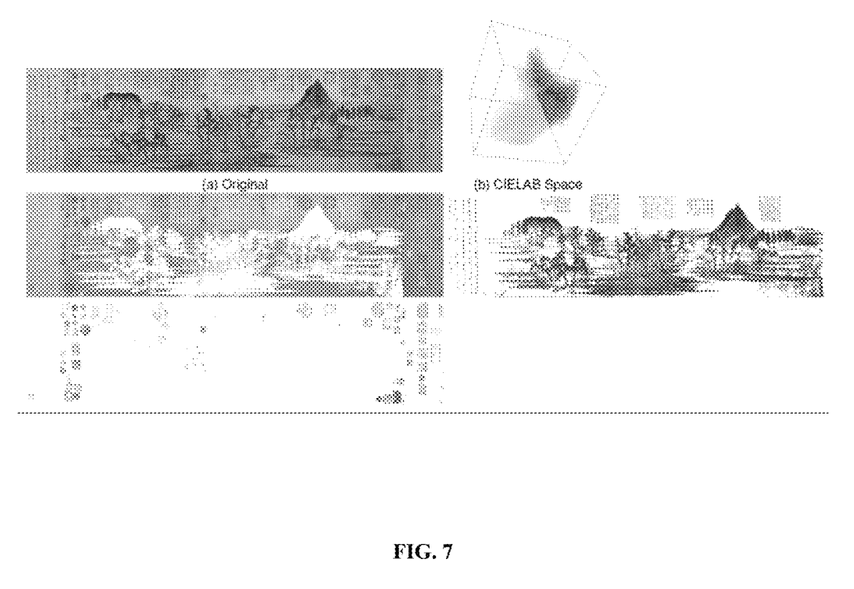
FIG. 7 shows the clustering outcomes of psKC on Zhao Mengfu's Autumn Colors.

As shown in FIG. 7, the background (plus red stamps) of this traditional Chinese painting is separated from the landscape, producing two clusters. The red stamps can be extracted as a cluster on its own if a different parameter setting is used. This image has a total of more than 1 million pixels. Point-set kernel clustering completed the clustering process in about one hour. Yet, DP was unable to load the dataset on a machine with 256 GB of main memory because of high memory requirement. Scalable kernel k-means took more than four days on the same machine (the run was terminated as it took too long to complete.)

Figure 8:
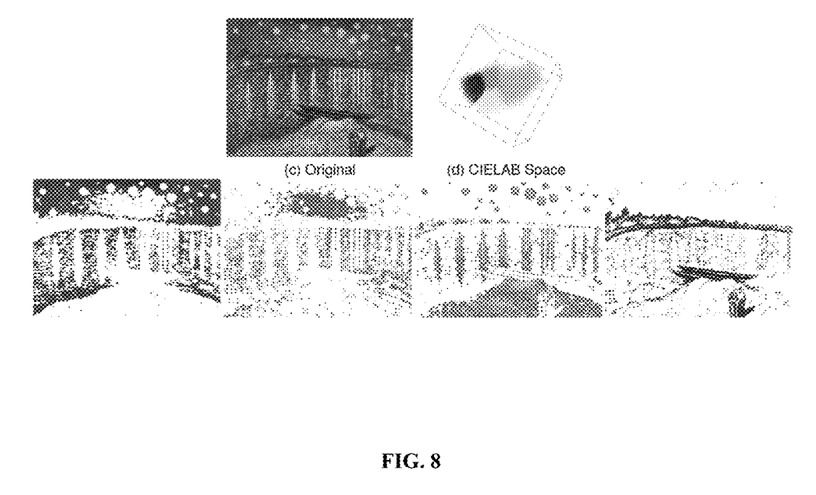
FIG. 8 shows the clustering outcomes of psKC on Vincent van Gogh's Starry Night over the Rhone 2.

FIG. 8 shows the clustering result of psKC only on Vincent van Gogh's Starry Night over the Rhone 2; as neither DP nor kernel k-means could complete in reasonable time. In summary, only psKC could complete the clustering of all datasets/images used in the experiments.

Figure 9:
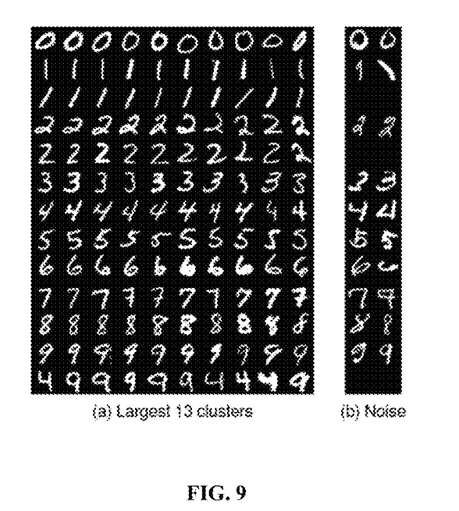
FIG. 9 shows the groups of handwritten digits found by psKC on the MNIST70k dataset which has 70,000 images.

Clustering a set of images. In the third experiment, psKC is used to cluster a set of images into several subsets of images, instead of segmenting one image into multiple segments. FIG. 9 shows the groups of handwritten digits found by psKC on the MNIST70k dataset which has 70,000 images. The largest 13 clusters produced by psKC cover 92% of the images in the dataset. FIG. 9a shows the clustering outcome of psKC of these clusters. FIG. 9b shows the sample noise images which do not belong to large clusters. The noise digits have significant different handwritten styles from those in the large clusters. Each of digits 1 & 2 has been grouped into two clusters, where each cluster has its own written style, e.g., digit 1 has a vertical written style in the first cluster; and a slant style in the second cluster.

Meanwhile, digits 4 & 9 are grouped into three clusters. In addition to the two pure clusters, the third cluster consists of both digits of 1:3 proportion. This is in contrast of the result produced by a kNN-graph based clustering algorithm RCC (short for Robust Continuous Clustering), where both digits 4 & 9 have been grouped into a single cluster. The digits grouped in the third cluster have different written styles from those in the two pure clusters of 4 & 9.

Figure 10:
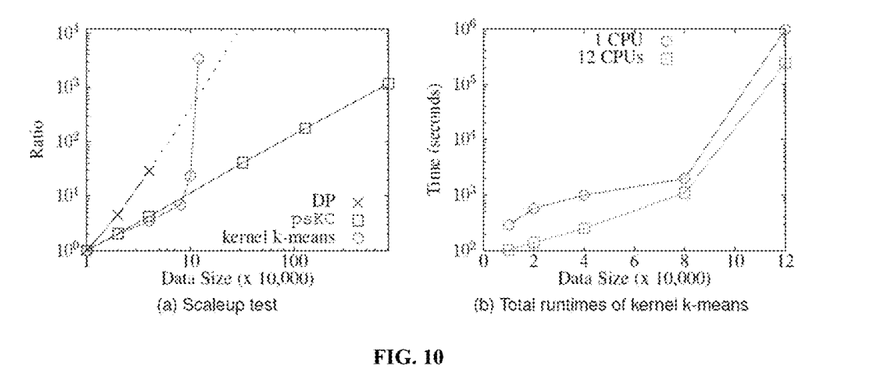
FIG. 10 shows the scaleup test results on the MNIST8M dataset, where the base in computing the ratio is the runtime at 10 k points.

Runtime experiment. In the fourth experiment, the MNIST8M dataset which has 8.1 million data points with 784 dimensions is used for the scaleup test. The runtime is measured in terms of CPU seconds (and include the GPU seconds when GPU is used.) FIG. 10 shows the experimental result that psKC has runtime linear to data set size. As the data size increases from 10 k to 8.1 million (a factor of 810), its runtime increases by a factor of 1,171 (including both feature mapping (GPU) and clustering (CPU)). In contrast, as the data size increases from 10 k to 40 k (a factor of 4), DP's runtime increases by a factor of 29. Note that DP took too long to run beyond 40 k points; and the dotted line of DP in FIG. 10a is a projected line beyond 40 k points. Kernel k-means has two main components: Nystrom approximation (to produce a finite dimensional feature map from a kernel of intractable dimensionality) and k-means. Using a super computer Cray XC40 system with 1632 compute nodes, each has two 2.3 GHz 16-core Haswell processors and 128 GB of DRAM, a previous experiment using scalable kernel k-means with s=20 on the MNIST8M dataset shows: The parallelization reduces the runtime of the Nystrom method, but it increases the runtimes of PCA and k-means. Thus, the net speedup is significantly less, e.g., increasing the number of compute nodes 16 times from 8 to 128, and the net speedup is less than 4 times. It is even less when the number of target dimensions is increased. This shows that parallelization alone has diminishing payoff as the complexity of the problem increases. In addition, increasing massive parallelization is required as the data size increases in order to obtain the result in reasonable time.

The experimental result in FIG. 10a shows the same behavior on a single-CPU machine. Scalable kernel k-means has similar runtime ratios as psKC up to 80 k. But its runtime began to dramatically increase at 120 k—the runtime increase is now more than 3000 times on a 12-fold increase in data size.

Even with 12 CPUs, as shown in FIG. 10b, scalable kernel k-means took more than 240,000 seconds to complete the dataset of 120 k, while the 1-CPU machine took close to 1 million seconds (more than 11 days). This is a speed up of 4 times on a 12-fold increase in the number of CPUs. In other words, the parallelization works well in scalable kernel k-means only if the number of CPUs is sufficiently large such that each CPU works on a small data set. Otherwise, a dramatic increase in runtime is expected, as shown in FIG. 10b.

In contrast, the algorithmic advantage of psKC, together with the use of the point-set kernel, allows it to run on a standard machine of single-CPU (for clustering) and GPU (for feature mapping in preprocessing). This enables the clustering to be run on a commonly available machine (with both GPU and CPU) to deal with large scale datasets.

In terms of real time: on the dataset with 40 k data points, psKC took 73 seconds which consists of 58 GPU seconds for feature mapping and 15 CPU seconds for clustering. In contrast, DP took 541 seconds. The gap in runtime widens as data size increases: To complete the run on 8.1 million points, DP is projected to take 379 years. That would be 12 billion seconds which is six orders of magnitude slower than psKC's 20 thousand seconds (less than 6 hours). The widening gap is apparent in FIG. 10a. For the dataset of 120 k data points, psKC took 253 seconds; whereas scalable kernel k-means took close to a million seconds, both on a one-CPU machine.

As it is, there is no opportunity for DP to do feature mapping (where GPU could be utilized). While it is possible for kernel k-means to make use of GPU as in psKC, the main restriction of scalable kernel k-means is PCA which has no efficient parallel implementation, to the best of our knowledge. The clustering procedures of both DP and psKC could potentially be parallelized, but this does not change their time complexities.

Figure 11:
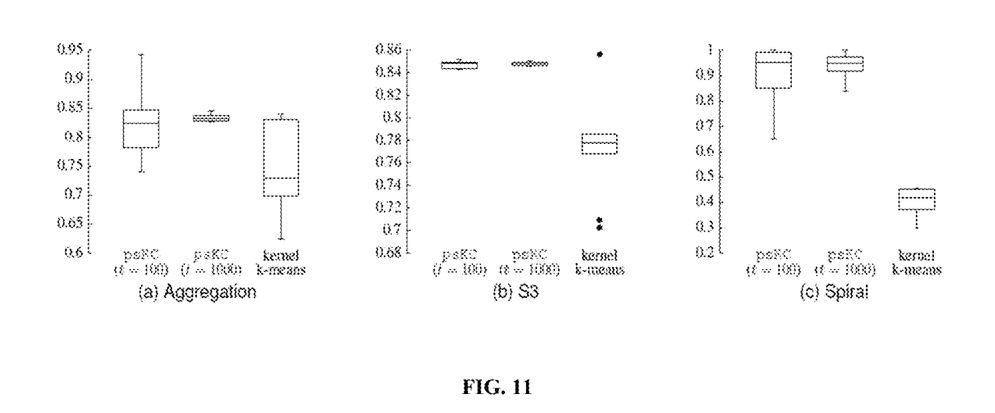
FIG. 11 is a set of boxplots demonstrating the stability of clustering, where each box plot is based on 10 trials of the same parameter setting for each algorithm and the y-axis is F1 score.

Stability test in the fifth experiment. FIG. 11 shows the stability of the clustering outcomes in terms of F1 score over 10 trials, presented in box plots. The results on Aggregation and S3 show that kernel k-means produced clustering which have variance much higher than those produced by psKC on the middle 50% results (shown as the box—small (large) box has low (high) variance). Kernel k-means produced wild outliers (see the three points outside the box) as shown on S3. Despite having its best result (the top outlier) is better than all other results, its two worst results (the bottom two outliers) are significantly worse than all other results.

On the Spiral dataset, psKC appears to have variance larger than kernel k-means. This is because kernel k-means produced significantly poorer clustering overall, having all 10 trials lower than 0.5 F1 score.

Overall, psKC (using t=100) produces higher F1 score than kernel k-means on all three datasets, where the median result is shown as the line inside the box. In addition, FIG. 11a to FIG. 11c also show that the variance can be significantly reduced by using a higher t setting at the cost of longer runtime. For example, on S3, psKC (using t=100) took 1.0 seconds, and psKC (using t=1000) took 9.2 seconds.

According to five experimental results, the clustering psKC outclasses DP, and two versions of kernel k-means in terms of both clustering outcomes and runtime efficiency. psKC algorithms have the following advantages. First, the algorithm is deterministic, given a kernel function and the user-specified parameters. This resolves the instability issue and often leads to better clustering outcomes. The only randomization is due to the Isolation Kernel. The use of most similar points in D as seeds is much more stable, even with different initializations of Isolation Kernel, compared with random groupings of clusters which can change wildly from one run to the next. Second, the psKC procedure enables detection of clusters of arbitrary shape, of different sizes and densities. Third, the psKC procedure commits each point to a cluster once it is assigned; and most points which are similar to the cluster never need to be reassigned. This is possible because of the use of a seed to grow a cluster. Points which are similar to a cluster grown from the seed will not be similar to another cluster if the points are less similar to the seeds of other clusters in the first place. The sequential determination of seeds (as opposed to the parallel determination of centers in k-means) makes that possible.

As a result, psKC avoids many unnecessary recomputations in k-means mentioned earlier. In other words, the clustering outcome of psKC is already close to the final maximization objective. The post-processing literally tweaks at the edges by reexamining those lowest similarity points regarding each cluster for possible reassignment to achieve the final maximization of the objective function.

In summary, the two root causes of shortcomings of existing clustering algorithms are: (i) the use of data independent point-to-point distance/kernel (where the kernel has a feature map with intractable dimensionality) to compute the required similarity directly; and (ii) the algorithmic designs that constrict the types of clusters that they can identify. For example, in the case of kernel k-means, even though a kind of point-set kernel is used, it can detect clusters of globular shape only in feature space; and this does not guarantee that non-globular shaped clusters in input space can be detected. These have led to poorer clustering outcomes and the longstanding runtime issue that have prevented them from dealing with large scale datasets.

These root causes are addressed by using a data dependent point-set kernel and a new clustering algorithm which utilizes the point-set kernel to characterize clusters—they encompass many types of clusters which cannot be detected by existing algorithms. As a result, psKC is the only clustering algorithm that is both effective and efficient—a quality which is all but nonexistent in current clustering algorithms. It is also the only kernel-based clustering that has runtime proportional to data size.

The clustering method for data mining of the present invention can be applied to multiple fields, and the image segmentation application is taken as an example in the above embodiment. The method of the data mining can also be applied to applications such as clustering a set of images, social media analysis, computer biology, market research, search engines, etc. When the data analysis is performed in the corresponding field, the data descriptor for each application shall be used to convert the original dataset into a set of vector representation.

The method is both effective and efficient that enables it to deal with large scale datasets. In comparison with the state-of-the-art density-peak clustering and scalable kernel k-means clustering, the method is more effective and runs orders of magnitude faster when applied to datasets of millions of data points, on a commonly used computing machine.

What is claimed is:

1. A computer implemented method of segmenting data, comprising steps of:
   a) receiving one image; and
   b) converting the image into a dataset of some descriptors, to form a dataset E; and
   c) converting each point in dataset E, using a feature map of Isolation Kernel, to a point in a dataset D; and
   d) using a point-set kernel to find the most similar point with respect to the dataset D and then use it as an initial seed for cluster G; and
   e) growing the cluster G at a set rate ($\varrho$) incrementally using the point-set kernel by recruiting most similar points from dataset D with respect to the cluster G; and the cluster stops growing when all points excluding the points in the cluster G in the dataset D have similarities with respect to the dataset D less than or equal to $\tau$, where $\tau$ is a similarity threshold; and
   f) growing the next cluster using the remaining points in the dataset D excluding the points in the cluster G by restarting from step d, until D is empty or no point can be found which has similarity more than $\tau$.

2. The method according to claim 1, wherein using a feature map of Isolation Kernel converting each point of dataset E to a point in a dataset D is comprised of: using a random sample of $\psi$ points from dataset E to produce a Voronoi diagram, where each Voronoi cell isolates one point from the rest of the points in the sample; $\tau$ Voronoi diagrams are produced from dataset E and each point x in dataset E is converted using the $\tau$ Voronoi diagrams to produce a feature vector $\Phi(x)$ of $t\psi$ binary attributes in dataset D: $x \rightarrow \Phi(x)$.

3. The method according to claim 2, wherein using a point-set kernel to find the most similar points with respect to the dataset D is comprised of
   producing kernel mean map $\hat{\Phi}(D)$ from a set of points D via averaging their feature mapped points $\Phi(X)$, and measuring the similarity between point x and set D using the point-set kernel $\hat{K}(x,D) = \langle \Phi(x), \hat{\Phi}(D) \rangle$.

4. The method according to claim 3, wherein the point-set kernel is configured to be used to describe a cluster in terms of similarity distribution.

5. The method according to claim 4, wherein the point-set kernel is represented as:

$$\hat{K}(x, G) = \langle \Phi(x), \hat{\Phi}(G) \rangle$$

and $$\hat{\Phi}(G) = \frac{1}{|G|} \sum_{y \in G} \Phi(y)$$

where $\hat{\Phi}$ is a kernel mean map of $\hat{K}$; and $\Phi$ is the feature map of a point-to-point kernel; and $\langle a, b \rangle$ denotes a dot product between two vectors a and b;

as the point-set kernel is constructed from a dataset D, the point-set kernel equations can be more precisely expressed as:

$$\hat{K}(x, G \mid D) = \langle \Phi(x \mid D), \hat{\Phi}(G \mid D) \rangle$$

and $$\hat{\Phi}(G \mid D) = \frac{1}{|G|} \sum_{y \in G} \Phi(y \mid D)$$

where $G \subseteq D$, and $\Phi$ is the feature map of Isolation Kernel which is constructed from D.

6. The method according to claim 5, wherein a post-processing is configured to be applied to all clusters produced by point-set kernel clustering to ensure that the following objective is achieved:

$$\text{argmax}_{G^1,\ldots,G^k} \sum_{j=1}^{k} \sum_{x \in G^j} \langle \hat{\Phi}(x), \hat{\Phi}(G^j) \rangle, \quad 5$$

where a dataset D having k clusters, $G^j$, j=1, ..., k the post-processing re-examines all points that have the lowest similarity with respect to the cluster $G^j$, If they could be reassigned to other cluster to maximized the total similarity.

7. The method according to claim 1, wherein the similarity threshold τ<1 and growth rate $\varrho \in (0,1)$.

8. Software stored on a non-transitory machine-readable medium comprising instructions for enabling a data processing system to:
   a) receive one image; and
   b) convert the image into a dataset of some descriptors to form a dataset E; and
   c) convert each pint in dataset E, using a feature map of Isolation Kernel, to a point in a dataset D; and
   d) use a point-set kernel to find the most similar point with respect to the dataset D and then use it as an initial seed for cluster G; and
   e) grow the cluster G at a set rate ($\varrho$) incrementally using the point-set kernel by recruiting most similar points from dataset D with respect to the cluster G; and the cluster stops growing when all points excluding the points in the cluster G in dataset D have similarities with respect to the dataset D less than or equal to τ, where τ is a similarity threshold.
   f) grow the next cluster using the remaining points in dataset D by restarting from step d, until D is empty or no point can be found which has similarity more than τ.

9. The method according to claim 1, wherein the point-set kernel clustering method is configured to be applied to cluster a set of images, and in social network analysis, computational biology, market research or search engine by replacing the one image with a dataset from one or each of these applications.

10. The method according to claim 9, wherein a data descriptor for each application is used to describe the original dataset, comprising either one data object or a set of data objects, into a set of points in vector representation.

11. The method according to claim 10, wherein the method of segmenting data applied to clustering a set of images, comprising the steps of:
   a) receiving a first set of images; and
   b) converting the set of images into a set of points in vector representation, to form a dataset E1, and
   c) converting each point of dataset E1, using a feature map of Isolation Kernel, to a point in a dataset D1; and
   d) using a point-set kernel to find the most similar points with respect to the dataset D1 and then use it as an initial seed for cluster G; and
   e) growing the cluster G at a set rate ($\varrho$) incrementally using the point-set kernel by recruiting most similar points from dataset D1 with respect to the cluster G; and the cluster stops growing when all points excluding the points in the cluster G in dataset D1 have similarities with respect to the dataset D1 less than or equal to τ, where τ is a similarity threshold; and
   f) growing the next cluster using the remaining points in D1 excluding G by restarting from step d, until D1 is empty or no point can be found which has similarity more than τ.

12. The method according to claim 10, wherein the method of segmenting data applied in computational biology, comprising the steps of:
   a) receiving one computational biology data object or a set of computational biology data objects; and
   b) converting the computational biology data object or the set of computational biology data objects into a set of points in vector representation, to form a dataset E2; and
   c) converting each point of dataset E2, using a feature map of Isolation Kernel, to a point in a dataset D2; and
   d) using a point-set kernel to find the most similar point with respect to the dataset D2 and then use it as an initial seed for cluster G; and
   e) growing the cluster G at a set rate ($\varrho$) incrementally using the point-set kernel by recruiting most similar points from dataset D2 with respect to the cluster G; and the cluster stops growing when all points excluding the points in the cluster G in dataset D2 have similarities with respect to the dataset D2 less than or equal to τ, where τ is a similarity threshold; and
   f) growing the next cluster using the remaining points in the dataset D2 excluding the points in the cluster G by restarting from step d, until D2 is empty or no point can be found which has similarity more than τ.

13. The method according to claim 10, wherein the method of segmenting data applied in market research, comprising the steps of:
   a) receiving one market research object or a set of market research data objects; and
   b) converting the market research data object or the set of market research data objects into a set of points in vector representation, to form a dataset E3; and
   c) converting each point of dataset E3, using a feature map of Isolation Kernel, to a point in a dataset D3; and
   d) using a point-set kernel to find the most similar point with respect to the dataset D3 and then use it as an initial seed for cluster G; and
   e) growing the cluster G at a set rate ($\varrho$) incrementally using the point-set kernel by recruiting most similar points from dataset D3 with respect to the cluster G; and the cluster stops growing when all points excluding the points in the cluster G in dataset D3 have similarities with respect to the dataset D3 less than or equal to τ, where τ is a similarity threshold; and
   f) growing the next cluster using the remaining points in the dataset D3 excluding the points in the cluster G by restarting from step d, until D3 is empty or no point can be found which has similarity more than τ.

14. The method according to claim 10, wherein the method of segmenting data applied in search engine, comprising the steps of:
   a) receiving one search engine object or a set of search engine data objects; and
   b) converting the search engine data object or the set of search engine data objects into a set of points in vector representation, to form a dataset E4; and
   c) converting each point of dataset E4, using a feature map of Isolation Kernel, to a point in a dataset D4; and
   d) using a point-set kernel to find the most similar point with respect to the dataset D4 and then use it as an initial seed for cluster G; and
   e) growing the cluster G at a set rate ($\varrho$) incrementally using the point-set kernel by recruiting most similar points from dataset D4 with respect to the cluster G; and the cluster stops growing when all points excluding the points in the cluster G in dataset D4 have similarities with respect to the dataset D4 less than or equal to τ, where τ is a similarity threshold; and f) growing the next cluster using the remaining points in the dataset D4 excluding the points in the cluster G by restarting from step d, until D4 is empty or no point can be found which has similarity more than τ.

15. The method according to claim 10, wherein the method of segmenting data applied in social network analysis, comprising the steps of:

a) receiving one social network analysis object or a set of social network analysis data objects; and b) converting the social network analysis data object or the set of search engine data objects into a set of points in vector representation, to form a dataset E5; and c) converting each point of dataset E4, using a feature map of Isolation Kernel, to a point in a dataset D5; and d) using a point-set kernel to find the most similar point with respect to the dataset D5 and then use it as an initial seed for cluster G; and e) growing the cluster G at a set rate ($\varrho$) incrementally using the point-set kernel by recruiting most similar points from dataset D5 with respect to the cluster G; and the cluster stops growing when all points excluding the points in the cluster G in dataset D5 have similarities with respect to the dataset D5 less than or equal to τ, where τ is a similarity threshold; and f) growing the next cluster using the remaining points in the dataset D5 excluding the points in the cluster G by restarting from step d, until D5 is empty or no point can be found which has similarity more than τ.

* * * * *